(12) United States Patent
Lee et al.

(10) Patent No.: US 9,658,051 B2
(45) Date of Patent: May 23, 2017

(54) SLOTLESS RESOLVER, METHOD FOR MANUFACTURING SAME, AND WIRING TOOL USED THEREFOR

(71) Applicant: DAESUNG ELECTRIC CO., LTD, Gyeonggi-do (KR)

(72) Inventors: Won Young Lee, Seoul (KR); Byung Cheol Na, Gyeonggi-do (KR)

(73) Assignee: DAESUNG ELECTRIC CO., LTD, Gyeonggi-Do (KR)

( * ) Notice: Subject to any disclaimer, the term of this patent is extended or adjusted under 35 U.S.C. 154(b) by 292 days.

(21) Appl. No.: 14/377,853

(22) PCT Filed: Dec. 13, 2012

(86) PCT No.: PCT/KR2012/010827
§ 371 (c)(1),
(2) Date: Aug. 10, 2014

(87) PCT Pub. No.: WO2013/118966
PCT Pub. Date: Aug. 15, 2013

(65) Prior Publication Data
US 2015/0028861 A1    Jan. 29, 2015

(30) Foreign Application Priority Data

Feb. 10, 2012  (KR) .................. 10-2012-0013528
Mar. 28, 2012  (KR) .................. 10-2012-0031515

(51) Int. Cl.
G01B 7/30    (2006.01)
G01D 5/20    (2006.01)
H01F 41/086  (2016.01)

(52) U.S. Cl.
CPC ............ G01B 7/30 (2013.01); G01D 5/2086 (2013.01); H01F 41/086 (2016.01)

(58) Field of Classification Search
CPC ......... H02P 6/16; H02P 21/18; H02K 11/215; B62D 15/0215; B62D 5/046; B62D 5/049;
(Continued)

(56) References Cited

U.S. PATENT DOCUMENTS 4,130,769 A * 12/1978 Karube .................. H02K 29/08
                                                310/156.12
4,445,061 A    4/1984 Jackson, Jr.
(Continued)

FOREIGN PATENT DOCUMENTS

CN    1183665 A    6/1998
CN    102055295 A  5/2011
(Continued)

*Primary Examiner* — Alesa Allgood
(74) *Attorney, Agent, or Firm* — Gokalp Bayramoglu

(57) ABSTRACT

The present invention relates to a resolver having a stator for detecting the rotational position of a rotor rotating at the inner center thereof. The stator includes: a stator core having a cylindrical shape; a plurality of excitation windings attached to the inner surface of the stator core at a predetermined distance in the circumferential direction, each of the plurality of excitation windings being tightly wound; a plurality of sine output windings stacked and attached to the patterns of the excitation windings in the circumferential direction, each of the plurality of sine output windings being loosely wound; and a plurality of cosine output windings stacked and attached to the patterns of the excitation windings in the circumferential direction, the sine output windings and the cosine output windings being alternately attached such that the sine output windings and the cosine output windings have the same winding distribution.

6 Claims, 5 Drawing Sheets

(58) Field of Classification Search
CPC ....... B62D 15/021; F04D 29/058; G01B 7/30; G01B 7/003; G01B 7/14; G01R 31/1227
See application file for complete search history.

(56) References Cited

U.S. PATENT DOCUMENTS

| | | | | |
|---|---|---|---|---|
| 4,476,422 | A | * | 10/1984 | Kirschbaum ........... H02P 25/20 310/198 |
| 4,645,961 | A | | 2/1987 | Malsky |
| 4,954,739 | A | | 9/1990 | Schultz et al. |
| 5,227,710 | A | * | 7/1993 | Lewus .................... H02P 25/04 318/781 |
| 8,664,962 | B2 | * | 3/2014 | Ogawa .................... H02K 3/28 310/112 |
| 2009/0108836 | A1 | * | 4/2009 | Nakamura ............ G01D 5/208 324/207.17 |
| 2010/0244816 | A1 | * | 9/2010 | Nakamura ............... G01B 7/30 324/207.25 |
| 2012/0091973 | A1 | * | 4/2012 | Horihata .................. H02P 9/48 322/29 |
| 2013/0043864 | A1 | * | 2/2013 | Ogawa .................. H02K 24/00 324/207.15 |

FOREIGN PATENT DOCUMENTS

| | | |
|---|---|---|
| DE | 102008051634 A1 | 4/2009 |
| JP | 3182493 B2 | 7/2001 |

* cited by examiner

SLOTLESS RESOLVER, METHOD FOR MANUFACTURING SAME, AND WIRING TOOL USED THEREFOR

TECHNICAL FIELD

The present invention relates to a resolver for detecting a rotational speed and a rotation angle of a rotor, and more particularly, to a slotless resolver not including teeth and slots for coil windings on the stator side, a method of manufacturing the slotless resolver, and a winding tool used for the slotless resolver.

BACKGROUND ART

A conventional resolver has been disclosed in Japanese Patent No. 3182493 "Variable Reluctance Type Angle Detector" (Date of registration: Apr. 20, 2001), etc. FIG. 1 illustrates the stator 10 of a resolver having such a principle.

A stator core 11, that is, an element of the stator 10, includes a plurality of teeth 11a formed on its inner surface at specific intervals in the circumferential direction of the stator core. A space called a slot 11b is formed between the teeth 11a.

A plurality of coils 12 is wound on the respective teeth 11a according to a specific rule, thus forming an excitation winding and a plurality of output windings.

A rotor (not illustrated), that is, a magnetic body having, eccentric force, is disposed at the center of the inside of the stator 10. When the rotor is rotated, voltage of a sine wave and voltage of a cosine wave are output through the plurality of output windings wound on the teeth 11a.

In accordance with the conventional resolver having such a structure, however, the teeth 11a and the slots 11b must be used for the winding of the coils 12. In order to fabricate the teeth 11a and the slots 11b, a complicated molding design was required and the fabrication of the teeth 11a and the slots 11b was relatively complicated.

In particular, since the conventional resolver has a concentration winding structure in which the coils 12 are wound on the teeth 11a only, an output voltage output through the concentration winding structure is always broken in the section between the teeth 11a, as illustrated in FIG. 2. Accordingly, there was a problem in that a high-frequency component is caused in sine wave output (refer to an arrow section in FIG. 2).

Furthermore, a large amount of silicon coated to insulate the coils 12 wound on the teeth 11a as much as the depth of the teeth 11a, but the silicon is not evenly coated on every corner of the coils 12 wound and seated in the teeth 11a and the slot 11b. Accordingly, there was a problem in that a sufficient insulation property is not secured.

DISCLOSURE

Technical Problem

An object of the present invention is to provide a resolver which can be simply fabricated without a complicated molding design for teeth and slots in a stator because the structure of the teeth and the slots is obviated, can remove a high-frequency component in an output waveform, enables the coating of insulating resin, such as silicon for the insulation of coils, to be easy, has a small amount of coating, and can secure a sufficient insulation property, a method of manufacturing the resolver, and a winding tool used for the resolver.

Technical Solution

In order to achieve the object, the present invention provides a resolver including a stator for detecting the rotational location a rotor that rotates in an inner center, wherein the stator includes a stator core having a cylindrical shape; a plurality of excitation windings attached to the inner surface of the stator core at a specific interval in a circumferential direction and each forming a concentration winding; a plurality of sine output windings attached on an excitation winding pattern in the circumferential direction in such a way as to be stacked and each forming a distribution winding; and a plurality of cosine output windings attached on the excitation winding pattern in the circumferential direction in such a way as to be stacked, the sine output windings and the cosine output windings being alternately attached such that the sine output windings and the cosine output windings have the same distribution winding.

In this case, each of the plurality of excitation windings, the plurality of sine output windings, and the plurality of cosine output windings may be attached on a surface of an insulating cover through a medium of the insulating cover.

In this case, the plurality of excitation windings and the plurality of sine output windings may be attached on a surface of an identical insulating cover in such a way as to be stacked.

Furthermore, each of the plurality of excitation windings, the plurality of sine output windings, and the plurality of cosine output windings may be fixed on a corresponding insulating cover by the coating of insulating resin.

Alternatively, the plurality of excitation windings, the plurality of sine output windings, and the plurality of cosine output windings may be fixed on the inner surface of the stator core by the coating of insulating resin.

Furthermore, in order to achieve the object, the present invention provides a winding tool used in a method of manufacturing a slotless resolver, including a shaft; a winding cylinder having the shall inserted into the winding cylinder and maintained on the outer circumference surface of the shaft at a specific interval; and a plurality of first slot pins and second slot pins detachably combined with the shaft through the winding cylinder along the outer circumference surface of the winding cylinder at a specific interval and spaced apart from one another in the direction of the shaft.

Furthermore, in order to achieve the object, the present invention provides a method of manufacturing a slotless resolver, including the steps of preparing a winding tool including a shaft, a winding cylinder having the shaft inserted into the winding cylinder and maintained on the outer circumference surface of the shaft at a specific interval, and a plurality of first slot pins and second slot pins detachably combined with the shaft through the winding cylinder along the outer circumference surface of the winding cylinder at a specific interval and spaced apart from one another in the direction of the shaft; forming winding patterns in the first slot pins and the second slot pins of the winding tool by winding input windings, sine output windings, and cosine output windings on an outer circumference surface of the winding cylinder; removing the first slot pins and the second slot pins by separating the first slot pins and the second slot pins from the shaft and the winding cylinder; and obtaining the winding patterns having a cylindrical shape by pulling and removing the winding cylinder from the winding patterns in the direction of the shaft.

In this case, the sine output windings and the cosine output windings may form distribution windings.

In this case, the excitation windings may form concentration windings.

Advantageous Effects

In accordance with the resolver according to the present invention described above, the resolver can be simply fabricated without a complicated molding design for fabricating teeth and slots in a stator because the teeth and the slots are removed. A high-frequency component conventionally caused on sine wave output can be removed because both the sine and the cosine output windings are formed of distribution windings unlike in a concentration winding method of winding the coil windings only on the conventional teeth. Unlike in the conventional coils wound on the teeth, the coating of insulating resin, such as silicon for the insulation of the coils, is simple with respect to the distribution windings directly attached to the stator core. The amount of the coating is small, and a sufficient insulation property can be secured.

Furthermore, since the distribution windings are stacked on the inner circumference surface of the stator core, a smaller diameter can be achieved compared to a conventional structure in which teeth are protruded to the inner circumference surface of a stator, which can contribute to the compactness of a product.

MODE FOR INVENTION

Hereinafter, embodiments of the present invention are described in detail with reference to accompanying drawings.

Figure 3:
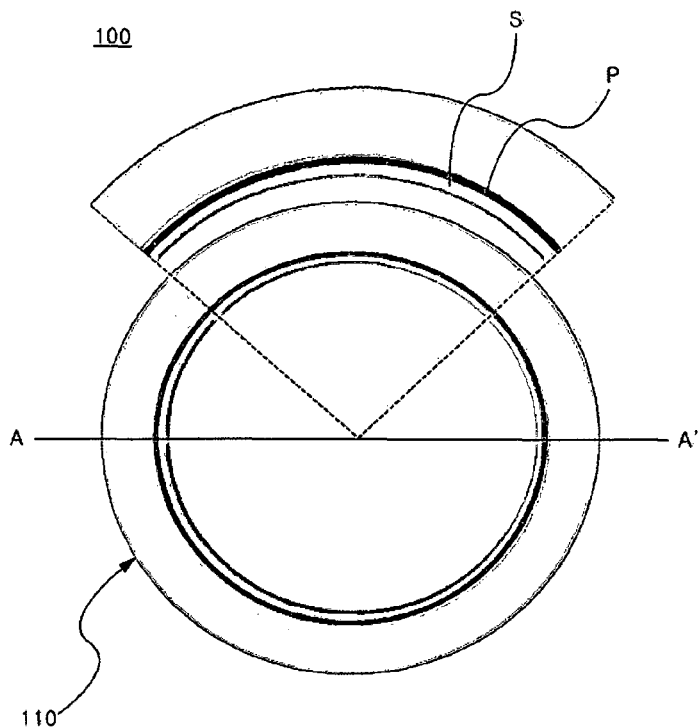
FIG. 3 is a plan view illustrating the stator of a resolver in accordance with an embodiment of the present invention.

The stator 100 of a resolver in accordance with an embodiment of the present invention, as illustrated in FIG. 3, includes a stator core 110 having a cylindrical shape, a pattern layer P attached to the inner circumference surface of the stator core 110, and a silicon layer S, that is, insulating resin coated on the pattern layer P.

Figure 1:
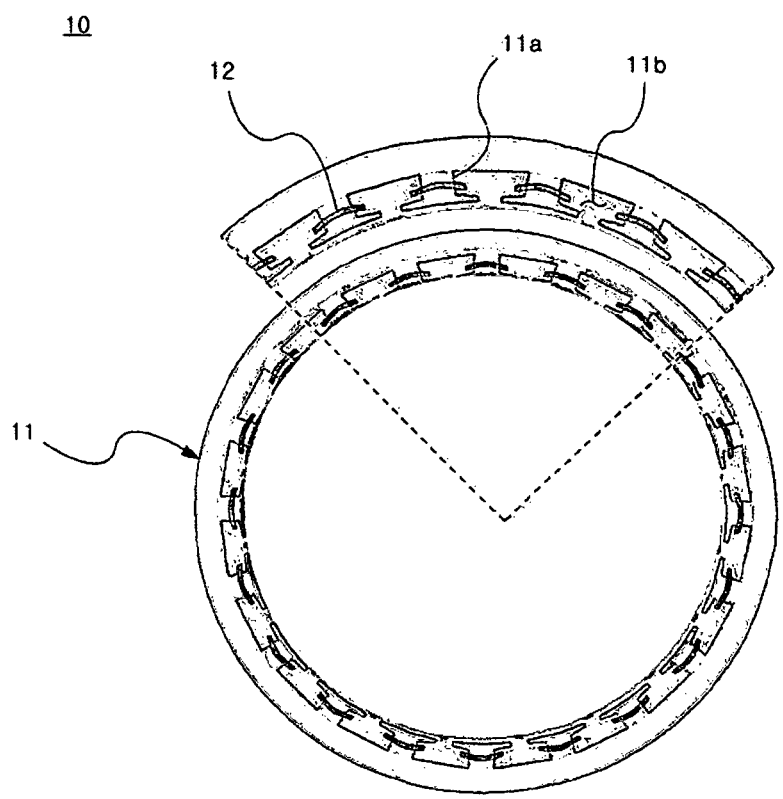
FIG. 1 is a plan view illustrating the stator of a conventional resolver.
Figure 2:
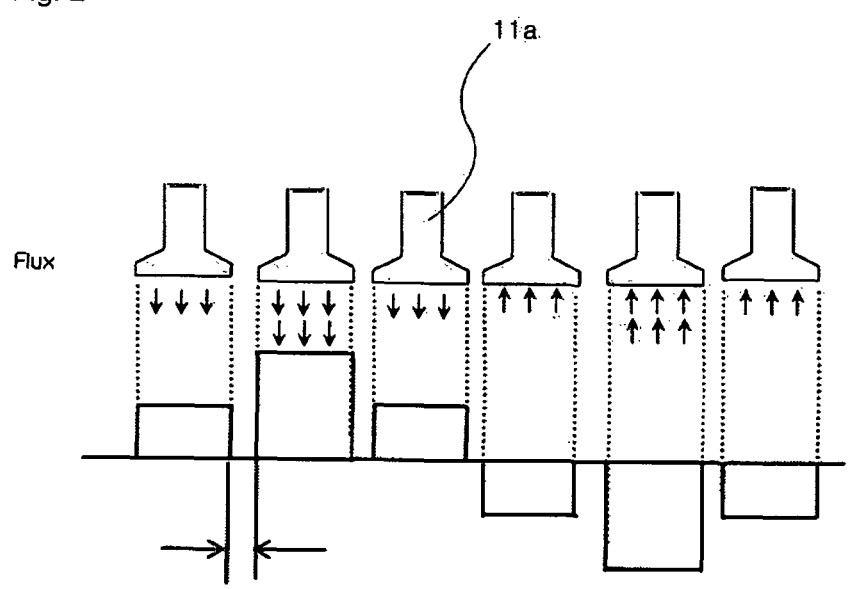
FIG. 2 is a conceptual diagram illustrating an output waveform according to the stator structure of FIG. 1.

Unlike in a prior art, the stator core 110 has a simple cylindrical shape not having the teeth (11a of FIG. 1 or the slots 11b protruded and formed on the inner circumference surface of the stator core 110.

The winding pattern P, as will be described later, includes a total of three layers having an excitation winding pattern, a sine output winding pattern, and a cosine output winding pattern. Such patterns are sequentially equipped with an excitation winding, a sine output winding, and a cosine output windings. The silicon layer (refer to 5) may be coated between the pattern layer in order to form a medium layer.

Figure 4:
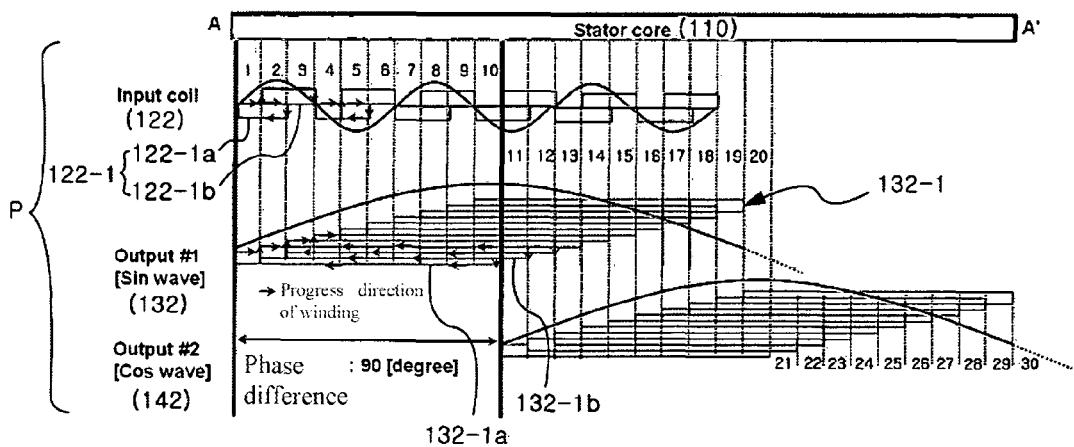
FIGS. 4 and 5 are a schematic cross-sectional view and plan view for conceptually illustrating distribution windings formed by excitation windings, sine output windings, and cosine output windings attached to the inner circumference surface of the stator of FIG. 3.

FIG. 4 is a virtual conceptual cross-sectional view of the stator 100 of FIG. 3 that is cut and unfolded along line A-A'. An excitation winding 122 belonging to the excitation winding pattern, a sine output winding 132 belonging to the sine output winding pattern, and a cosine output winding 142 belonging to the cosine output winding pattern are sequentially stacked on the winding pattern P attached to the inner surface (the bottom in FIG. 4) of the stator core 110.

The excitation winding 122 includes a plurality of distribution windings 122-1 each having two turns 122-1a, 122-1b divided into upper and lower layers in a circumferential direction. In this case, each of the turns 122-1a, 122-1b forming a single distribution winding 122-1 has a bundle of several strands of coils, for example, 17 strands of coils.

Figure 5:
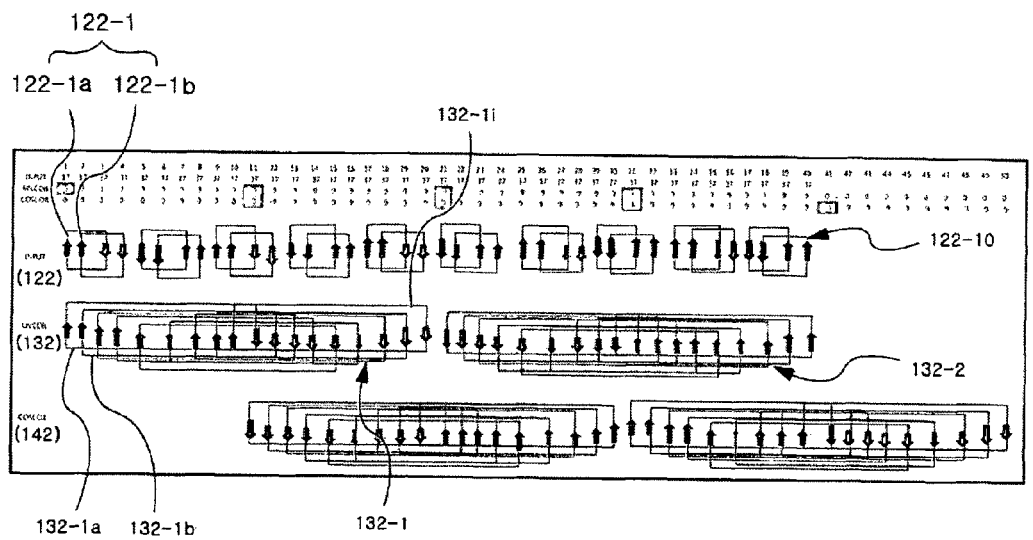

The plurality of excitation windings 122 provided as described above is disposed at specific intervals in 360 degrees. In the present embodiment, as illustrated in FIG. 5, 10 distribution winding 122-1 to 122-10 each having two turns are disposed at specific intervals in the circumferential direction. Furthermore, a single distribution winding 122-1 is distributed as much as 2 turns because the first turn 122-1a and the second turn 122-1b are partially overlapped from side to side within a corresponding section, that is, a section of 360/10=36 degrees.

In this case, the distribution winding is a term compared to a concentration winding to a concentration bond, and refers to the relationship in which turns forming each distribution winding are evenly distributed in an unfolded form so that they are partially overlapped with respect to the section in which the distribution winding is disposed, not the relationship in which the tunas forming the distribution winding are stacked up and down so that they are matched with each other.

In FIG. 4, the sine output winding 132 is disposed on the inside (i.e., the lower side) of the excitation winding 122.

The sine output winding 132 also includes a plurality of distribution windings 132-1 provided in the circumferential direction and each having a plurality of turns 132-1a, 132-1b divided into upper and lower layers. In this case, each of the turn 132-1a, 132-1b forming a single distribution winding 132-1 has a bundle of several strands of coils, for example, 9 strands of coils.

The plurality of sine output windings 132 provided as described above is disposed at specific intervals in 360 degrees. In the present embodiment, as illustrated in FIG. 5, two distribution windings 132-1 to 132-2 each formed of 9 turns are disposed at specific intervals in the circumferential direction. Furthermore, a single distribution winding 132-1 is distributed as much as 9 turns because a first turn 132-1a to a ninth turn 132-1i are partially overlapped from side to side within a corresponding section, that is, a section of 360/2=180 degrees.

That is, the turns 132-1a to 132-1i of a single distribution winding 132-1 are configured to be distributed so that they are partially overlapped by a value obtained by dividing the distribution section of 180 degrees, occupied by the distribution winding 132-1, by the number of turns (9), that is, at a 20-degree shifted interval. In this case, the interval may be designed an equal interval or a non-equal interval depending on embodiments.

Finally, in FIG. 4, the cosine output winding 142 is disposed on the inside (i.e., the lower side) of the sine output winding 132.

The cosine output winding 142 has the same distribution winding as the sine output winding 132 except that it is disposed at a phase difference of 90 degree from the sine output winding 132, and thus a description thereof is omitted.

Meanwhile, the excitation winding 122 may maintain a concentration winding as in a prior art because it is not directly related to the output of the resolver related to a high frequency. That is, the excitation winding 122 may be configured by disposing and fixing each excitation coil wound by a concentration winding in each region corresponding to a conventional slot.

Figure 6:
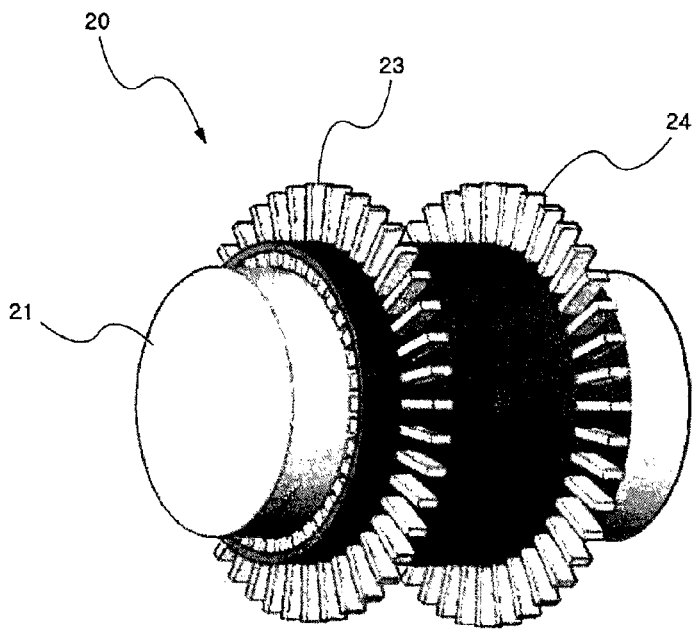
FIG. 6 is a perspective view of a winding tool for forming the distribution windings of FIG. 5.

Furthermore, the excitation winding 122, the sine output winding 132, and the cosine output winding 142 described above may be fabricated as the winding pattern P in which the excitation winding 122, the sine output winding 132, and the cosine on winding 142 are integrated through the medium of specific insulating resin using a winding tool 20 illustrated in FIG. 6.

To this end, in the state in which the shaft 21 of the winding tool 20 has been inserted into winding cylinders 22, a plurality of first and second slot pins 23, 24 passes through the winding cylinders 22 at specific intervals along the outer circumference surface of the winding cylinders 22, and is fit into and combined with the shaft 21.

In this case, a specific interval is maintained between the first slot pins 23 and the second slot pins 24 in the direction of the shaft.

Accordingly, a coil is wound using the first slot pins 23 and the second slot pins 24 as supports, and thus may be arranged and attached to the winding cylinders 22 in a specific and desired distribution winding form.

Figure 7:
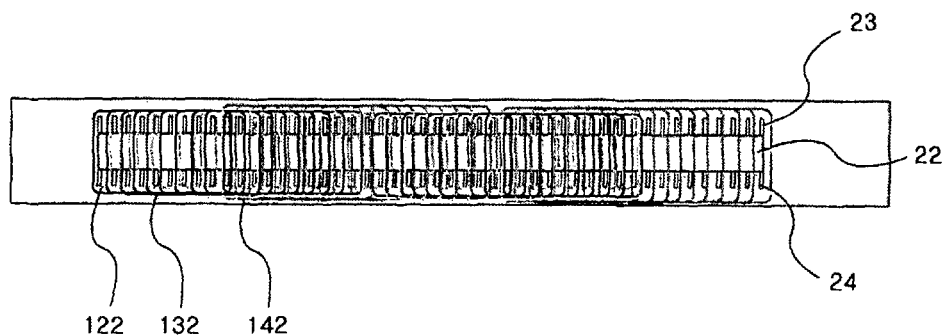
FIG. 7 is an exploded view illustrating a shape in which the distribution windings of FIG. 5 are wound on the winding tool of FIG. 6.

FIG. 7 is an exploded view illustrating a shape in which the excitation windings 122, the sine output windings 132, and the cosine output windings 142 are wound using the winding tool 20.

The windings 122, 132, and 142 form respective winding patterns that are stacked and completed, and insulating resin may be attached and fixed between the layers of the windings 122, 132, and 142.

Alternatively, the excitation winding pattern, the sine output winding pattern, and the cosine output winding pattern obtained by winding the excitation winding 122, the sine output winding 132, and the cosine output winding 142 may be attached to an insulating sheet (not illustrated) having a cylindrical shape and sequentially stacked, thereby being capable of completing the winding patterns.

In this case, silicon may be coated on the windings 122, 132, and 142 of the excitation winding pattern, the sine output winding pattern, and the cosine output winding pattern, thereby being capable of achieving insulation in such a manner that the corresponding windings 122, 132, and 142 are buried in the silicon layer S. In this case, the silicon layer S in which the winding 122, 132, or 142 is buried is stacked between the layers of the excitation winding pattern, the sine output winding pattern, and the cosine output winding pattern.

If the excitation winding pattern 122 is a concentration winding as described above, the winding pattern may be completed in the same manner as that described above except that the winding is intensively wound in each of the pair of guide protrusions 23, 24.

When the windings of the excitation winding 122, the sine output winding 132, and the cosine output winding 142 is completed as in FIG. 7, all the first slot pins 23 and the second slot pins 24 are pulled out and removed from the shaft 21 (refer to FIG. 6). Only the winding patterns can be separated by removing the winding cylinders 22 placed on the inner circumference surface of the winding 122, 132, and 142 that are stacked and formed.

Figure 8:
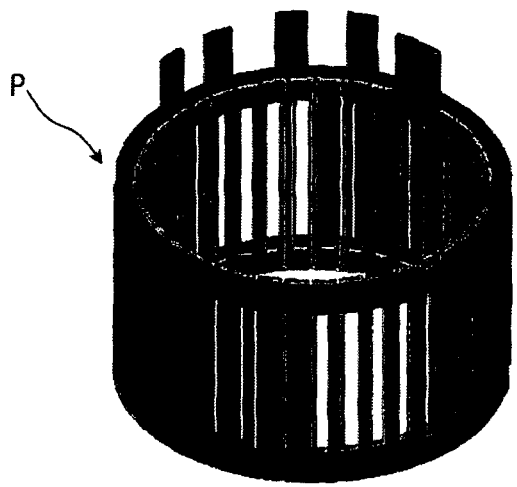
FIG. 8 is a photograph of a winding coil fabricated by the winding tool of FIG. 6.

The separated winding pattern P has a shape similar to that illustrated in FIG. 8.

Figure 9:
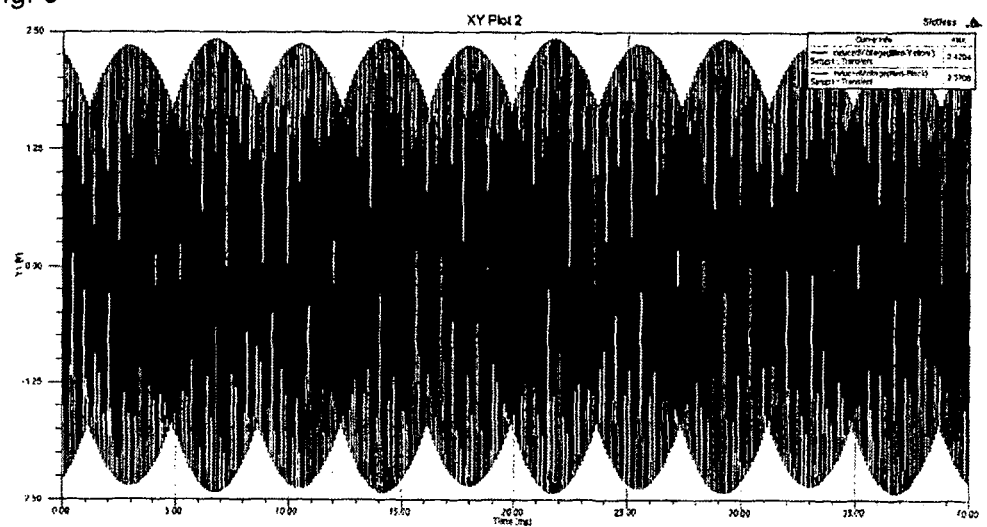
FIG. 9 is a graph illustrating an output waveform for verifying the model of the resolver having the stator of FIG. 3.

FIG. 9 is a graph illustrating an electromagnetic field analysis output waveform for verifying a resolver model having a so-called slotless stator 100 configured as described above. From FIG. 9, it may be seen that the slotless stator 100 has almost the same output form as the conventional stator 10 including the coils 12 each intensively wound on each of the teeth (11a of FIG. 1) as a concentration winding.

Figure 10:
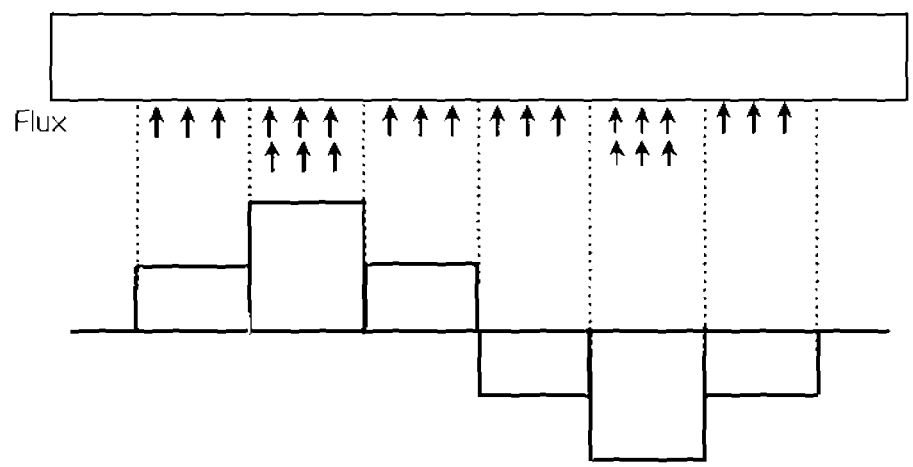
FIG. 10 is a conceptual diagram illustrating an output waveform according to the stator structure of FIG. 3.

The stator 100 in accordance with an embodiment of the present invention has a structure in which all the sine output windings 132 and the cosine output windings 142 included in the stator 100 have the aforementioned distribution windings. Accordingly, output voltage output through the sine output windings 132 and the cosine output windings 142 does not generate a high-frequency component because it has sine wave output not having a broken section as illustrated in FIG. 10 (refer to an arrow section in FIG. 10).

Meanwhile, the slotless resolver including the aforementioned stator 100 is merely an embodiment for helping understanding of the present invention, and the scope to technical range of the present invention should not be limited to the description.

The scope to technical range of the present invention is determined by the claims and equivalents thereof.

DESCRIPTION OF REFERENCE NUMERALS

| | |
|---|---|
| 100: stator | 110: stator core |
| 122: excitation winding | 122-1: distribution winding |
| 122-1a, 122-1b: unit turn of distribution winding | |
| 132: sine output winding | |
| 142: cosine output winding | P: winding pattern |
| S: silicon layer | 20: winding tool |
| 21: shaft | 22: winding cylinder |
| 23: first slot pin | 24: second slot pin |

The invention claimed is:

1. A resolver comprising a stator for detecting a rotational location of a rotor that rotates in an inner center,
wherein the stator comprises:
a stator core having a cylindrical shape;
an excitation winding pattern, a sine output winding pattern, and a cosine output winding pattern which are stacked to each other;
wherein the excitation winding pattern is defined by a plurality of excitation windings attached to an inner surface of the stator core at a specific interval in a circumferential direction, and each of the plurality of excitation windings forms a concentration winding;
wherein the sine output winding pattern is defined by a plurality of sine output windings provided in the circumferential direction in such a way as to be stacked, and each of the plurality of sine output windings forms a distribution winding; and wherein the cosine output winding pattern is defined by a plurality of cosine output windings provided in the circumferential direction in such a way as to be stacked, the sine output windings and the cosine output windings being alternately attached such that the sine output windings and the cosine output windings have the same distribution winding.

2. The resolver of claim 1, wherein the plurality of excitation windings, the plurality of sine output windings, and the plurality of cosine output windings are fixed on an inner surface of the stator core by coating of insulating resin.

3. The resolver of claim 1, wherein each of the plurality of excitation windings, the plurality of sine output windings, and the plurality of cosine output windings is attached on a surface of an insulating cover through a medium of the insulating cover.

4. The resolver of claim 3, wherein each of the plurality of excitation windings, the plurality of sine output windings, and the plurality of cosine output windings is fixed on the corresponding insulating cover by coating of insulating resin.

5. The resolver of claim 3, wherein the plurality of excitation windings and the plurality of sine output windings are attached on a surface of an identical insulating cover in such a way as to be stacked.

6. The resolver of claim 5, wherein each of the plurality of excitation windings, the plurality of sine output windings, and the plurality of cosine output windings is fixed on the corresponding insulating cover by coating of insulating resin.

* * * * *